United States Patent Office 3,732,250
Patented May 8, 1973

3,732,250
PREPARATION OF THIOLACTONES
Peter E. Fritze, West Millington, and George L. Brode, Somerville, N.J., assignors to Union Carbide Corporation, New York, N.Y.
No Drawing. Filed May 20, 1971, Ser. No. 145,464
Int. Cl. C07d 63/06, 61/00; 67/00
U.S. Cl. 260—327 R          11 Claims

ABSTRACT OF THE DISCLOSURE

Thiolactones have been prepared by contacting lactones in the vapor phase with a sulfur containing donor over a Lewis base in an inert atmosphere at a temperature of about 150 to 350° C.

BACKGROUND OF THE INVENTION

This invention pertains to a method of preparing thiolactones from lactones in the vapor phase and in particular to the preparation of epsilon-thiocaprolactones.

Epsilon-thiocaprolactones are known materials which have been used as solvents, as initiators for the anionic polymerization of lactams such as epsilon-caprolactam and as monomers for conversion to poly-(epsilon-thiocaprolactones). Poly(epsilon-thiocaprolactones) have been used as plasticizers for vinyl resins.

C. G. Overberger and J. K. Weise disclosed the preparation of epsilon-thiocaprolactone by the cyclization of 6-mercaptohexanoic acid in the Journal of the American Chemical Society, volume 90, pages 3533–3537 (1968). This procedure for preparing epsilon-thiocaprolactone is not commercially acceptable because the yields are relatively low and the raw materials are relatively expensive.

German Pat. 859,456 discloses the preparation of gamma-thiobutyrolactone and delta-thiovalerolactone by a liquid phase reaction of the corresponding lactone with hydrogen sulfide at elevated temperatures and pressures in the presence of small amounts of alkaline materials.

German Pat. 809,557 discloses the liquid phase preparation of gamma-thiobutyrolactone from gamma-butyrolactone and carbon disulfide at elevated temperatures and pressures in the presence of sodium sulfide.

It should be noted that neither of the methods disclosed in German Pats. 859,456 and 809,557 could be used to convert ε-caprolactone to ε-thiocaprolactone. A further distinction between this prior art and the claimed invention lies in the fact that a soluble catalyst system is used in the former as distinguished from a heterogeneous catalyst system in the latter. The various basic differences between homogeneous and heterogeneous catalyst systems is well known in the art.

SUMMARY OF THE INVENTION

A method of preparing thiolactones having the formula:

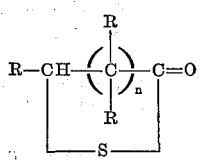

wherein $n$ is an integer having a value of from 1 to 6 wherein at least $n$ plus two R's are hydrogen and wherein the remaining R's are lower alkyl groups having up to 8 carbon atoms, has been developed which comprises contacting a lactone having the formula:

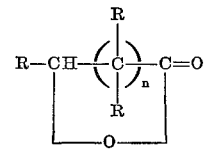

wherein $n$ and R are as defined above with a sulfur containing donor selected from the class consisting of carbon disulfide and carbonyl sulfide in the vapor phase over a Lewis base catalyst at a temperature of about 150° C. to about 350° C. in an inert gas atmosphere free of oxygen in a mole ratio of lactone to sulfur containing donor of about 1 to about 0.5–100 until at least about 1% by weight of said lactone is converted to said thiolactone.

DESCRIPTION OF THE INVENTION

The lactones preferred in this invention are the epsilon-caprolactones having the general formula:

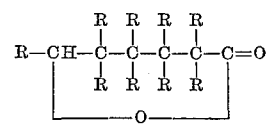

wherein at least six of the R's are hydrogen and the remainder are lower alkyl groups having up to 4 carbon atoms and the total number of carbon atoms in the substituents on a lactone ring does not exceed about 8. Unsubstituted epsilon-caprolactone in which all of the R's are hydrogen is commercially available. Substituted epsilon-caprolactones and mixtures thereof are available by reacting a corresponding substituted cyclohexanone with an oxidizing agent such as peracetic acid as described in U.S. 3,064,008 incorporated herein by reference.

Among the substituted epsilon-caprolactones considered suitable for the purposes of this invention are the various monoalkyl epsilon-caprolactones such as the monomethyl-, monoethyl-, monopropyl-, monoisopropyl-, and the like; dialkyl epsilon-caprolactones in which the two alkyl groups are substituted on the same or different carbon atoms, but not both on the epsilon carbon atom; trialkyl epsilon-caprolactones in which 2 or 3 carbon atoms in the lactone ring are substituted, so long as the epsilon carbon atom is not substituted.

Other lactones including β-pivalolactone, γ-butyrolactone, δ-valerolactone, zeta-enatholactone and eta-caprylolactone may also be used as the lactone for conversion to the corresponding thiolactone.

The choice of catalysts for the conversion of lactone to thiolactone is critical in this vapor phase operation in that it is limited to Lewis bases of cations derived from Groups I–A and II–A of the Deming Periodic Chart of the elements shown on pages 56 and 57 of the Handbook of Chemistry, edited by N, A. Lange, McGraw-Hill Book Company, New York city (1961), and anions such as hydroxide, oxides, sulfides, hydrosulfides, or alkoxides, the latter containing about 3 to about 6 carbon atoms. This specificity is shown by the fact that such catalysts as sodium fluoride, lithium phosphate and nickel oxide show little or no activity in the instant invention although they are disclosed in British Pat. 1,092,687 and 1,092,610 as being effective for the conversion of ethylene oxide to ethylene sulfide with carbon disulfide.

The choice of sulfur containing donor is also critical in that apparently only carbon disulfide, carbonyl sulfide or mixtures thereof can be used.

Pressure is not critical in the instant invention. However atmospheric pressures are preferred for economic reasons although either subatmospheric or superatmospheric pressures can be used if desired.

Although reaction temperatures of about 150° C. to about 350° C. can be used, it is preferred to employ temperatures of about 250° C. to about 300° C.

The mole ratio of lactone to sulfur containing donor is preferably about 1 to about 10–20 although ratios of about 1 to about 0.5 or about 1 to about 5–100 can be used if desired as well as ratios above 1:100 although the process becomes less economical at these higher ratios.

The preferred cations are those derived from alkali metals including sodium, potassium, lithium and the like and the preferred anions are the sulfides, hydroxides and oxides.

Although not essential it is preferred that the Lewis base catalysts of this invention be deposited and used on a catalyst carrier or support. Exemplary catalyst carriers or supports are alumina ($Al_2O_3$), alundum, asbestos, bauxite, cements, clay, diatomaceous earth, ferric oxide, fiberglass, kaolinite, magnesia, pumice, silica-alumina, silica gel, silicon carbide, titanium dioxide, zinc oxide and the like.

There is no critical reaction time or as is sometimes expressed in gas phase catalytic reactions, residence time or throughput rate. The preferred time factor is best expressed as that process time required to convert about 1% of ε-lactone to ε-thiolactone. This figure is not narrowly critical but represents a minimum practical conversion.

The use of an inert atmosphere is critical in the practice of this invention although the choice of gas to afford this condition is not critical. Thus for economy reasons it is convenient to employ nitrogen as the gas providing the inert atmosphere although carbon dioxide, argon, neon, krypton, xenon, and the like can also be used if desired. The function of this inert atmosphere is simply to exclude oxygen from the system which at these elevated temperatures forms a combustible mixture with the sulfur containing donor.

This invention is preferably practiced as a continuous process although a batch type ystem can also be used.

This invention is further described in the examples which follow. All parts and percentages are by weight unless otherwie specified.

EXAMPLE 1

A reaction zone consisting of a glass tube 19 millimeters wide and 30 centimeters long was charged with a catalyst comprising about 2% by weight of sodium sulfide deposited on a non-acidic alumina catalyst support which is described below. The reaction zone tube was fitted with a thermocouple well and a heating jacket. The lactone was pumped through a preheater into a mixing zone by means of a F. A. Hughes micropump with a 5:1 reducing gear at a rate of 8 ml. per hour. Carbon disulfide was also passed into a preheater and following that into a mixing zone meeting the caprolactone there, at a rate of 105 ml. per hour through the outer head of the F. A. Hughes Micropump. The mixing vessel was a glass tube 4" x 18" packed with type 316 helipack (Podbielniak). The mixture of carbon disulfide and epsilon-caprolactone was passed into the reaction zone together with a positive pressure of nitrogen constantly maintained throughout the apparatus. The rate of carbon disulfide and epsilon-caprolactone addition could be changed and regulated with the aforesaid pump. The reaction temperature in the reaction zone was set at 270° C. and the liquid phase effluent from the reaction zone analyzed for carbon disulfide, epsilon-caprolactone and epsilon-thiocaprolactone by gas chromatography with a meter by ¼ inch column charged with 5% O.V.-22 (65% phenyl silicone and 35% methyl silicone mixture of the Ohio Valley Chemical Co.) on 95% 80/100 mesh Chromosorb G hp. (trademark for Johns Manville high performance adsorbent). The percent conversion of epsilon-caprolactone to epsilon-thiocaprolactone was about 12% by weight. The gaseous effluent was monitored with aqueous barium hydroxide and found to contain carbon dioxide.

The above described supported catalyst was prepared as follows:

Sodium aluminate (252 g. of Baker and Adamson code 2195) consisting of 65% $NaAlO_2$ and 15–20% NaOH was dissolved in 3 liters of water. Then 15–25% ml. of concentrated nitric acid was added with stirring until the first formed particles would no longer dissolve. Then gaseous carbon dioxide was passed into the mixture until the precipitation was complete. The filtered precipitate was washed until neutral to litmus, dried at 115° C. and pelletized.

Forty grams of the above non-acidic alumina was soaked with a concentrated aqueous solution of 4.3 g. $Na_2S.9H_2O$ and placed in a vacuum oven for 16 hours followed by conditioning in the reaction zone described in example at 300° C. for 48 hours under a constant flow of nitrogen.

The above described experiment called for roughly a 12:1 weight ratio of carbon disulfide to epsilon-caprolactone which corresponds to a mole ratio of about 16:1, carbon disulfide to epsilon-caprolactone.

EXAMPLE 2

Example 1 was repeated with the exception that magnesium oxide was used as the catalyst without support at a temperature of 250° C. and a carbon disulfide to epsilon-caprolactone mole ratio of about 16:1. A 5% conversion of epsilon-caprolactone to epsilon-thiocaprolactone was obtained.

Control A which consisted of using non-acidic alumina without any catalyst deposit thereon at a mole ratio of carbon disulfide to epsilon-caprolactone of 16:1 and a reaction temperature of 290° C. gave an insignificant conversion of less than about 0.5% of ε-caprolactone to thiocaprolactone.

Control B consisted of using nickel oxide as the catalyst at a carbon disulfide to caprolactone mole ratio of 16:1 and a reaction temperature of about 250 to 290° C. No epsilon-thiocaprolactone was obtained.

Control C consisted of employing lithium phosphate as the catalyst and a weight ratio of carbon disulfide to epsilon-caprolactone of 12:1 and a reaction temperature of about 250 to 295° C. No epsilon-thiocaprolactone was obtained.

Control D: To a pressure vessel purged with nitrogen were added 130 g. ε-caprolactone, 120 g. carbon disulfide and 2 g. sodium sulfide. After heating 5 hours at 170° C. excess carbon disulfide was distilled off. The residue was polymeric in nature and did not contain monomeric ε-thiocaprolactone.

Control E: To a pressure vessel purged with nitrogen were added 130 g. ε-caprolactone, 55 g. hydrogen sulfide and 2 g. sodium sulfide. After heating for 10 hours at 200° C. and devolatilization of excess hydrogen sulfide a grey polymeric material was recovered, which did not contain ε-thiocaprolactone monomer.

EXAMPLE 3

When Example 1 is repeated with the exception that γ-butyrolactone is substituted for ε-caprolactone, a comparable conversion to ε-thiobutyrolactone is achieved.

EXAMPLE 4

When Example 1 is repeated with the exception that δ-valerolactone is substituted for ε-caprolactone, a comparable conversion to δ-thiovalerolactone is achieved.

Although the invention has been described in its preferred forms with a certain degree of particularity, it is understood that the present disclosure of the preferred forms has been made only by way of example and that numerous changes may be resorted to without departing from the spirit and the scope of the invention.

What is claimed is:

1. A method of preparing thiolactones having the formula:

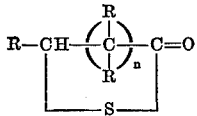

wherein $n$ is an integer having values of about 1 to about 6, wherein at least $n+2$ Rs are hydrogen and wherein the remaining R's are lower alkyl, which comprises contacting a lactone having the formula:

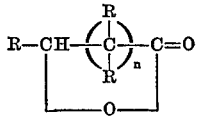

wherein $n$ and R are as defined above with a sulfur containing donor selected from the class consisting of carbon disulfide and carbonyl sulfide in the vapor phase over a Lewis base catalyst composed of a cation of a metal selected from the group consisting of metals of Group I-A or Group II-A of the Deming Periodic Table and an anion selected from the group consisting of hydroxides, oxides, sulfides, hydrosulfides or alkoxides, at a temperature of about 250° C. to about 350° C. in an inert gas atmosphere free of oxygen in a weight ratio of lactone to sulfur containing donor of about 1 to about 0.5–100 until at least about 1 percent by weight of said lactone is converted to said thiolactone.

2. Method claimed in claim 1 wherein the Lewis base is composed of a cation of a metal selected from the group consisting of metals of Group I-A of the Deming Periodic Chart of the elements and the anion is a sulfide.

3. Method claimed in claim 2 wherein the Lewis base is an alkali metal sulfide.

4. Method claimed in claim 3 where the alkali metal sulfide is sodium sulfide.

5. Method claimed in claim 1 wherein the Lewis base is an alkaline earth oxide.

6. Method claimed in claim 5 wherein the alkaline earth oxide is magnesium oxide.

7. Method claimed in claim 1 wherein the thiolactone is ε-thiocaprolactone and the lactone is ε-caprolactone.

8. Method claimed in claim 1 wherein the sulfur containing donor is carbon disulfide.

9. Method claimed in claim 1 wherein the sulfur containing donor is carbonyl sulfide.

10. Method claimed in claim 1 wherein the Lewis base is contained on a catalyst support.

11. Method claimed in claim 10 wherein the catalyst support is a non-acidic aluminum oxide.

References Cited

FOREIGN PATENTS

| | | | |
|---|---|---|---|
| 809,557 | 7/1951 | Germany | 260—327 R |
| 1,092,610 | 11/1967 | Great Britain. | |

HENRY R. JILES, Primary Examiner

R. J. BOND, Assistant Examiner

U.S. Cl. X.R.

260—327 TH, 332.3 AL